(12) United States Patent
Won et al.

(10) Patent No.: US 7,054,856 B2
(45) Date of Patent: May 30, 2006

(54) SYSTEM FOR DRAWING PATENT MAP USING TECHNICAL FIELD WORD AND METHOD THEREFOR

(75) Inventors: Jeong Wook Won, Taejon (KR); Hyoung Bok Lee, Taejon (KR); Jai Sang Koh, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 921 days.

(21) Appl. No.: 09/995,718

(22) Filed: Nov. 29, 2001

(65) Prior Publication Data

US 2003/0026459 A1 Feb. 6, 2003

(30) Foreign Application Priority Data

Jul. 23, 2001 (KR) ............................... 2001-44269

(51) Int. Cl.
*G06F 17/30* (2006.01)
*G06F 7/00* (2006.01)

(52) U.S. Cl. .................. 707/3; 707/10; 707/104.1; 705/1

(58) Field of Classification Search .......... 707/1–104.1
See application file for complete search history.

(56) References Cited

U.S. PATENT DOCUMENTS

| | | | | | |
|---|---|---|---|---|---|
| 4,839,853 | A | * | 6/1989 | Deerwester et al. | ............ 707/5 |
| 5,301,109 | A | * | 4/1994 | Landauer et al. | ............... 704/9 |
| 5,576,954 | A | * | 11/1996 | Driscoll | ......................... 707/3 |
| 5,623,679 | A | * | 4/1997 | Rivette et al. | ............... 715/526 |
| 5,623,681 | A | * | 4/1997 | Rivette et al. | ............... 715/522 |
| 5,642,502 | A | * | 6/1997 | Driscoll | ......................... 707/5 |
| 5,754,840 | A | * | 5/1998 | Rivette et al. | ................. 707/2 |
| 5,799,325 | A | * | 8/1998 | Rivette et al. | ............... 715/500 |
| 5,806,079 | A | * | 9/1998 | Rivette et al. | ............... 715/512 |
| 5,809,318 | A | * | 9/1998 | Rivette et al. | ............... 715/512 |
| 5,845,301 | A | * | 12/1998 | Rivette et al. | ............... 715/512 |
| 5,873,056 | A | * | 2/1999 | Liddy et al. | .................... 704/9 |
| 5,950,214 | A | * | 9/1999 | Rivette et al. | ............... 715/512 |
| 5,963,940 | A | * | 10/1999 | Liddy et al. | .................... 707/5 |
| 5,991,751 | A | * | 11/1999 | Rivette et al. | ................. 707/1 |
| 5,991,780 | A | * | 11/1999 | Rivette et al. | ............... 715/512 |
| 6,006,221 | A | * | 12/1999 | Liddy et al. | .................... 707/5 |
| 6,014,663 | A | * | 1/2000 | Rivette et al. | ................. 707/4 |
| 6,018,749 | A | * | 1/2000 | Rivette et al. | ............... 715/525 |
| 6,026,388 | A | * | 2/2000 | Liddy et al. | .................... 707/1 |
| 6,038,561 | A | * | 3/2000 | Snyder et al. | ................. 707/6 |

(Continued)

FOREIGN PATENT DOCUMENTS

EP 1139238 A2 * 4/2001

(Continued)

OTHER PUBLICATIONS

Kim, W.D. and K.R. Lee "Patent Technology Portfolio for SAW Filters", Proceedings of the 1994 IEEE Ultrasonics Symposium, 1994, pp. 139-142.*

(Continued)

*Primary Examiner*—Luke S Wassum
(74) *Attorney, Agent, or Firm*—Mayer, Brown, Rowe & Maw LLP

(57) ABSTRACT

A system and a method for drawing a patent map using a technical field word are disclosed. In the system and the method, a word to be used for drawing a patent map is extracted by calculating weight values of significant words which are gotten by removing unnecessary words from patent data, and this extracted word is matched with a patent to draw the patent map.

14 Claims, 6 Drawing Sheets

U.S. PATENT DOCUMENTS

| | | | | |
|---|---|---|---|---|
| 6,076,088 A * | 6/2000 | Paik et al. | ...................... | 707/5 |
| 6,263,335 B1 * | 7/2001 | Paik et al. | ...................... | 707/5 |
| 6,339,767 B1 * | 1/2002 | Rivette et al. | .................. | 707/2 |
| 6,389,434 B1 * | 5/2002 | Rivette et al. | .............. | 715/512 |
| 6,473,753 B1 * | 10/2002 | Katariya et al. | ............... | 707/4 |
| 6,499,026 B1 * | 12/2002 | Rivette et al. | .................. | 707/2 |
| 6,662,178 B1 * | 12/2003 | Lee | ............... | 707/3 |
| 6,751,621 B1 * | 6/2004 | Calistri-Yeh et al. | ........ | 707/100 |
| 6,877,137 B1 * | 4/2005 | Rivette et al. | .............. | 715/512 |
| 2003/0026459 A1 * | 2/2003 | Won et al. | .................. | 382/113 |
| 2003/0061243 A1 * | 3/2003 | Kim et al. | .................. | 707/200 |
| 2003/0084022 A1 * | 5/2003 | Nakano | ......................... | 707/1 |
| 2003/0229470 A1 * | 12/2003 | Pejic | ........................... | 702/179 |
| 2004/0024733 A1 * | 2/2004 | Won et al. | ...................... | 707/1 |
| 2004/0181427 A1 * | 9/2004 | Stobbs et al. | ................... | 705/1 |
| 2004/0230570 A1 * | 11/2004 | Hatta et al. | ..................... | 707/3 |

FOREIGN PATENT DOCUMENTS

| | | | | |
|---|---|---|---|---|
| JP | 2001092825 A | * | 4/2001 | |
| JP | 2001092851 A | * | 4/2001 | |
| KR | 97-23742 | | 12/1997 | |

OTHER PUBLICATIONS

Commercial Times (Taiwan) "The Launching of the 2nd Generation of Patent Mapping Software", Jan. 12, 1996, p. 14.*

Business Wire "Innovative Technology Tool Unveiled: Advanced Patent Data Mining and Visualization Capabilities for Information Users", Press Release, Dec. 3, 1996.*

Manning & Napier Information Serives "Patent Data Mining Tool Now on the Web", Press Release, Jul. 3, 1997.*

Business Wire "SmartPatents Introduces Next Version of its Intellectual Property Asset Management System", Press Release, Feb. 9, 1998.*

IBM "Intellectual Property Network", Powerpoint presentation, Proceedings of the EPIDOS Patent Information Exhibition, Oct. 20-22, 1998.*

Franklin Pierce Law Center "Tools for Patent Searching", downloaded from www.ipmall.info, 1998.*

Calistri-Yeh, R. and B. Yuan "The MAPIT Patent-TSV System", Version 2.7, Manning and Napier Information Services, Jan. 11, 2000.*

Moore, P.L. "For Sale: Great Ideas, Barely Used: Yet2.com Gives Companies a Place to Market Their Patents", Business Week, No. 3675, Apr. 3, 2000, p. 78.*

McLean, A.W. "Patent Space Visualization for Patent Retrieval", Proceedings of the ACM SIGIR 2000 Workshop on Patent Retrieval, Jul. 14, 2000.*

Kando, N. and M-K Leong "Workshop on Patent Retrieval: SIGIR 2000 Workshop Report", Proceedings of the ACM SIGIR 2000 Workshop on Patent Retrieval, Jul. 28, 2000.*

Anderson, S. "Information Visualization at the Turn of the Century", AALL Spectrum, vol. 5, No. 2, Oct. 2000, pp. 4-8.*

Fall, C.J., A Torcsvari, K. Benzineb and G. Karetka "Automated Categorization in the International Patent Classification", SIGIR Forum, vol. 37, No. 1, Spring 2003, pp. 10-25.*

Yeap, T., G.H. Loo and S. Pang "Computational Patent Mapping: Intelligent Agents for Nanotechnology", Proceedings of the International Conference on MEMS, NANO and Smart Systems (ICMENS'03), Jul. 20-23, 2003.*

Iwayama, M., A. Fujii , N. Kando and Y. Marukawa "An Empirical Study on Retrieval Models for Different Document Genres: Patents and Newspaper Articles", Proceedings of ACM SIGIR 03, Jul. 28-Aug. 1, 2003, pp. 251-258.*

Ella Cheong Mirandah and Sprusons (ECMS) "iPMaps", Press Release, Sep. 30, 2003.*

IPOS "Unlocking the Hidden Value of Patents with Patent Mapping", downloaded from www.surfip.gov.sg, Nov. 2003.*

Fujii, A., M. Iwayama and N. Kando "Test Collections for Patent-to-Patent Retrieval and Patent Map Generation in NTCIR-4 Workshop", NTCIR-4, Jun. 2-4, 2004.*

Uchida, H. and A. Mano "Patent Map Generation Using Concept-Based Vector Space Model", NTCIR-4, Jun. 2-4, 2004.*

Shinmori, A., M. Okumura, Y. Marukawa and M. Iwayama "Can Claim Analysis Contribute Toward Patent Map Generation?", NTCIR-4, Jun. 2-4, 2004.*

Fujii, A., M. Iwayama and N. Kando, "The Patent Retrieval Task in the Fourth NTCIR Workshop", Proceedings of ACM SIGIR'04, Jul. 25-29, 2004, pp. 560-561.*

KIPO "KIPO Patent Map Project", downloaded from ptac.wips.co.kr/wips/english/html/information/info_03.html, Jun. 28, 2005.*

KIPO "Patent Map (Patent Analysis)", downloaded from ptac.wips.co.kr/wips/english/html/service/service_07.html, Jun. 28, 2005.*

KIPO "WIPS History", downloaded from www.wipsglobal.com/2005/about/history.asp?PageNo=602, Jun. 28, 2005.*

Patent Information Analysis System, Korea Industrial Property Office (Translation of Introduction Only).

* cited by examiner

SYSTEM FOR DRAWING PATENT MAP USING TECHNICAL FIELD WORD AND METHOD THEREFOR

FIELD OF THE INVENTION

The present invention relates to a system for drawing a patent map using a technical field word, and its method; and more particularly, to a system for drawing a patent map using a technical field word, and its method, in which a patent map is drawn by calculating weight values of significant words which are gotten by removing unnecessary words from patent data, and to a record medium capable of being read through a computer which has a recording of a program to realize the inventive method.

PRIOR ART OF THE INVENTION

At present, in the Republic of Korea, it was developed a software tool for drawing a patent map in a patent information system such as WIPS, and the Korean Industrial Property Office has developed a patent information analysis system (PIAS) having its similar function. Like this, in the system for processing patent information by a software method to draw the patent map, the system is connected to a patent database of a site which provides the patent information in charge or free, and automatically receives a down-load of information necessary for this patent database, namely, bibliographic terms, the claims range, the abstract and the detailed description of the invention, etc., and stores them at the database of the already drawn patent map drawing system.

For instance, describing it more in detail, in a case of searching for a corresponding patent, for example, containing a word of a "QPSK" with a desired searching condition, namely, a searching word, by connecting with the patent database of the USPTO, a patent list containing a "QPSK" word is represented on a web site screen at this time, a patent search user clarifies the corresponding list, receives an automatic download of patent information corresponding to the patent list, and stores it at its inside database.

In the patent stored at the database of this patent map drawing system, only a needed patent is stored through a work of deleting or replacing the same patent in a series of works.

In a PIAS as one sort of the patent map drawing system, it was difficult to do a classification work by patent techniques without seeing contents of an invention in executing the classification work by the patent techniques. Therefore, it was used a method of performing a concerned allocation on the basis of technical sorts classified every patent by a user him/herself after reading the abstract or the specification of each patent. For example, there is a phase modulating method such as a phase shift keying (PSK), and herewith, in classifying, the patents concerning of the phase modulating method such as this PSK, by techniques such as a DPSK, a QPSK and an OPSK etc., the patent map having several kinds of types can be made through the technical classification based on a desired type after reading all the corresponding specifications and executing the technical classification for respective patents one by one.

Therefore, there is in the conventional patent drawing system an inconvenience that a person who executes the patent map working should see the specifications one by one, which requires much time for drawing the patent map and causes a drop problem in a utility of the patent map.

SUMMARY OF THE INVENTION

Therefore, it is an object of the present invention to provide a system for drawing a patent map using a technical field word, and its method, in which words for drawing a patent map are extracted by calculating weight values of significant words which are gotten by removing unnecessary words from patent data, and this extracted words are matched with patents to draw the patent map, and to provide a record medium capable of being read through a computer which has a recording of a program to realize the inventive method.

In accordance with an aspect of the present invention, there is provided a system for drawing a patent map using a technical field word includes a storing unit for receiving a download of patent information from at least one patent information providing site and storing it; an extractive object selection and sentence extracting unit for selecting at least one word extraction object and extracting a sentence of the selected word extraction object from the patent information stored at the storing unit; a clause separating unit for separating, in a unit of a clause, the sentence of the extractive object selected at the extractive object selection and sentence extracting unit; a word extracting unit for counting the number of words in the sentence which is separated in a unit of a clause at the clause separating unit, calculating weight values and the sum of the weight values by respective words, and extracting the word; a word matching unit for matching the word extracted from the word extracting unit, with a patent; a patent map drawing unit for drawing a patent map referring to data matched in the word matching unit; and a patent map drawing controlling unit for controlling the word extraction object of the extractive object selection and sentence extracting unit.

In accordance with another aspect of the present invention, there is provided a system for drawing a patent map using a technical field word including a storing unit for receiving a download of patent information from at least one patent information providing site and storing it; an extractive object selection and sentence extracting unit for selecting at least one word extraction object and extracting a sentence of the selected word extraction object from the patent information stored at the storing unit; a clause separating unit for separating, in a unit of a clause, the sentence of the extractive object selected at the extractive object selection and sentence extracting unit; a useless character eliminating unit for eliminating a useless character corresponding to an already stored useless word list from the sentence of a clause unit separated in the clause separating unit, and extracting the sentence of the clause unit which is gotten by removing the useless character; a word extracting unit for selectively receiving the sentence based on a unit of a clause from which the useless character is removed in the useless character eliminating unit, or the sentence separated in a unit of a clause in the clause separating unit, counting the number of words, calculating weight values and the sum of the weight values by respective words, and extracting the word; a word matching unit for matching the word extracted from the word extracting unit, with a patent; a patent map drawing unit for drawing a patent map referring to data matched in the word matching unit; and a patent map drawing controlling unit for controlling the word extraction object of the extractive object selection and sentence extracting unit, and also controlling a selective output of the clause separating unit.

In accordance with further another aspect of the present invention, there is provided a method of drawing a patent map which is applied to the patent map drawing system, the method including the steps of: a) receiving a download of patent information from at least one patent information providing site and storing it at an inside database; b) selecting at least one word extraction object and extracting a sentence from the patent information stored at the inside database; c) separating, in a unit of a clause, the sentence of the selected extractive object; d) eliminating a useless character corresponding to an already stored useless word list from the sentence separated in a unit of a clause, and extracting the sentence of a clause unit which is gotten by removing the useless character; e) selectively receiving the sentence based on a unit of a clause from which the useless character is removed, or the sentence separated in a unit of a clause, counting the number of words, calculating weight values and the sum of the weight values by respective words, and extracting the word; and f) matching the extracted word with a patent, and drawing a patent map.

In accordance with still further another aspect of the present invention, there is provided computer readable recording medium storing instructions for executing a method of drawing a patent map using a technical field word, in a patent map drawing system having a processor, said method comprising the steps of: a) receiving a download of patent information from at least one patent information providing site and storing it at an inside database; b) selecting at least one word extraction object and extracting a sentence from the patent information stored at the inside database; c) separating, in a unit of a clause, the sentence of the selected extractive object; d) eliminating a useless character corresponding to an already stored useless word list from the sentence separated in a unit of a clause, and extracting the sentence of a clause unit which is gotten by removing the useless character; e) selectively receiving the sentence based on a unit of a clause from which the useless character is removed, or the sentence separated in a unit of a clause, counting the number of words, calculating weight values and the sum of the weight values by respective words, and extracting the word; and f) matching the extracted word with a patent, and drawing the patent map.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
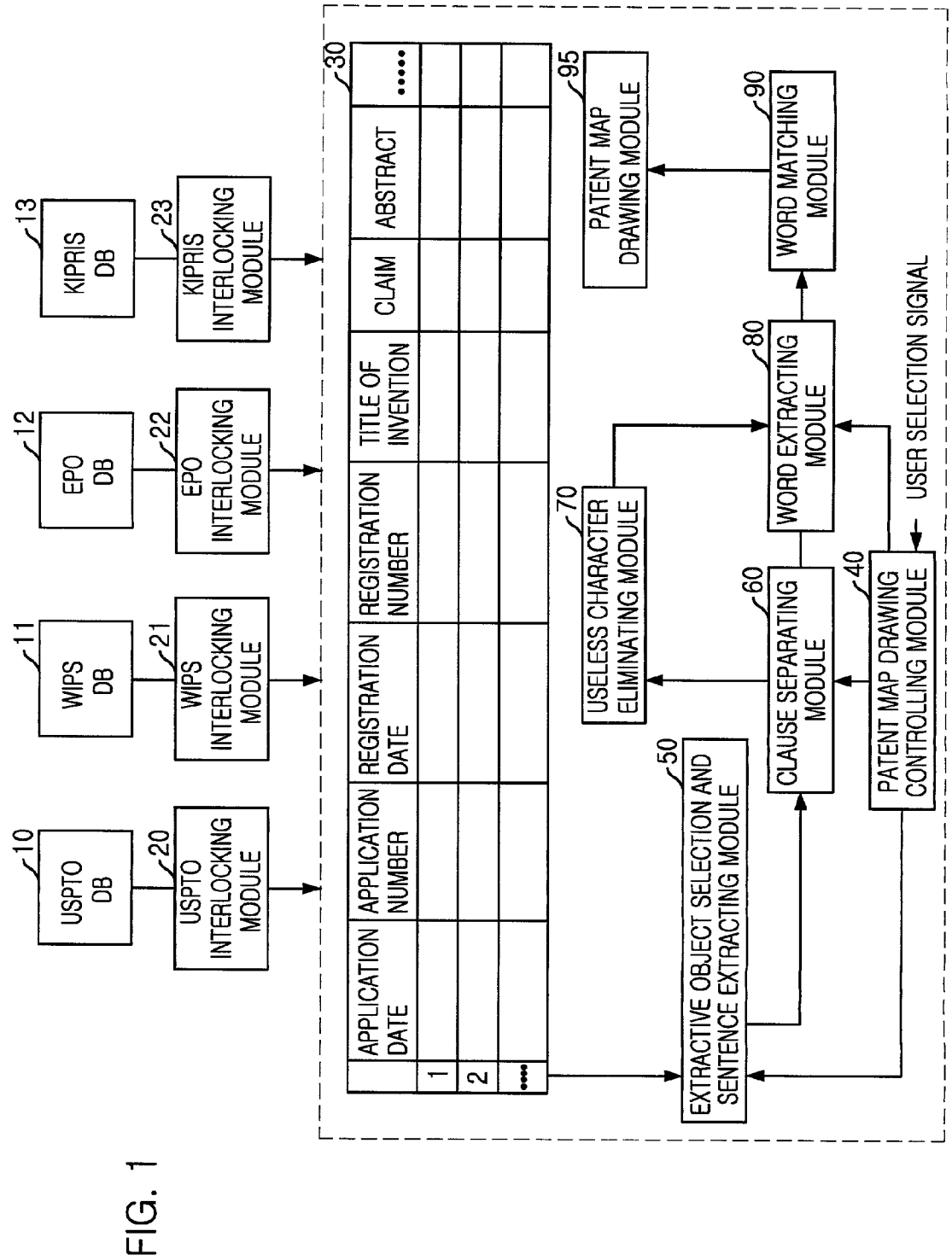
FIG. 1 is a block diagram in one embodiment of a system for drawing a patent map using a technical field word in accordance with the present invention.

FIG. 1 is a block diagram in one embodiment of a system for drawing a patent map using a technical field word in accordance with the present invention.

As shown in FIG. 1, a system for drawing a patent map includes an inside database 30, a patent map drawing controlling module 40, an extractive object selection and sentence extracting module 50, a clause separating module 60, a useless character eliminating module 70, a word extracting module 80, a word matching module 90 and a patent map drawing module 95.

The patent map drawing controlling module 40 controls a general patent map drawing of a patent map drawing system in response to an inputted selection signal of a user, and also controls an extractive object of the extractive object selection and sentence extracting module 50 and a word extraction of the word extracting module 80.

Also, the patent map drawing control module 40 controls so that the clause separating module 60 selectively outputs a sentence separated in a unit of a clause to the word extracting module 80 or to the useless character eliminating module 70 in response to the selection signal of the user.

The inside database 30 receives a download of patent information provided from respective patent information providing sites 10, 11, 12, 3 through respective interlocking equipments 20, 21, 22, 23, and stores it, and provides the extractive object selection and sentence extracting module 50 with the patent information.

Herewith, the patent information stored at the inside database contains bibliographic terms, and also contains the title of the invention, the abstract, the claims and the detailed description of the invention which contain a word, and stores by separating it in respective extractive objects.

The extractive object selection and sentence extracting module 50 selects a corresponding extractive object on the basis of the patent information provided by the inside database 30, extracts a sentence contained into the extractive object, and provides the clause separating module 60 with it.

Herewith, as the extractive object which is typically usable among sentences of the extractive object, it is desirable to use the claims, and in the detailed description of the invention, too much load may be caused to process it by a computer of a slow speed since much time is relatively taken to extract a corresponding sentence. Further, though it is generally selected one extractive object; terms more than two, namely, the title of the invention and the claims, can be selected as the extractive object according to a necessity of a user.

The clause separating module 60 performs a separation for a sentence of the selected extractive object in a unit of a clause, and provides the sentence separated in a unit of a clause to the useless character eliminating module 70 or the word extracting module 80 by the selection signal of the user inputted from the patent map drawing controlling module 40.

That is, the clause separating module 60 performs a separation by a space, in separating the sentence of the extractive object by a unit of a sentence, or performs the separation with special characters, for instance, "/", colon, semicolon, etc. Herewith, the condition of the clause separation is to be selected according to a designation of a user.

In the useless character eliminating module 70, the sentence separated in a unit of a clause, which is provided from the clause separating module 60, is compared with the already stored useless character list, to remove a useless character from the sentence, and the sentence from which the useless character is eliminated is sent to the word extracting module 80.

Herewith, the useless word list stored at the useless character eliminating module 70 is provided in a dictionary type, and the inputted sentence based on a unit of a clause is compared with the useless word list. If a word corresponding to the useless word list exists in the sentence based on a unit of a clause, the corresponding word is removed from the sentence provided under a unit of a clause.

Further, in order to remove the useless word exactly, a characteristic of each language should be considered. That is, it is respectively provided a common useless word list corresponding to all of language areas, a useless word list corresponding to Korean language, and a useless word list corresponding to a foreign language, and a sentence based on a unit of a corresponding clause is compared with these lists in sequence, to thereby, preferably extract the sentence from which all unnecessary characters are removed finally. Herewith, a detailed operation in the removal of the useless character will be described more in detail referring to FIG. 2 to be explained later.

The word extracting module 80 receives the sentence based on a unit of a clause from the useless character eliminating module 70 or the clause separating module 60 by a selection of a user inputted from the patent map drawing controlling module 40, extracts useful numerous words from this sentence, calculates a weight value per word by dividing the rest numerous words on the basis of the most many word number among such extracted numerous words, computes the sum of weight for the calculated word, and extracts the word.

Herewith, the word extracting module 80 receives only the sentence based on a unit of a clause, the sentence being outputted from the clause separating module 60, in case that the useless character eliminating module 70 is not applied to the inventive system. Meantime, in case the sentence of a clause unit is not provided from the clause separating module 60 to the word extracting module 80, the word extracting module 80 receives only the sentence of a clause unit from which the useless character is removed in the useless character eliminating module 70. In such two cases, there is no need a selection signal of the patent map drawing controlling module 40.

The word matching module 90 matches the word extracted by the word extracting module 80 with the patent, and provides the patent map drawing module 95 with the matched word information.

Here, in the word matching procedure, it is general to match the extracted word with the patent in 1:1 rate, but it is valid to match in a plural matching of 1:N by the user. For example, in case one patent contains a word A and a word B more than two, it can be processed by a 1:1 matching and it can be also processed by a plural matching of 1:N which simultaneously contains more than two patents, by comparing whether the word A or the word B is more.

The patent map drawing module 95 draws a patent map by a technical field, a nation, an application period and an applicant on the basis of the patent matched by the word matching module 90.

For instance, it can be classified by collecting patents corresponding to a "phase modulation" and by dividing them into "BPSK ", "QPSK" and "OCQPSK" etc. in a PSK modulation system, and in again classifying the "QPSK" it can be classified into a "modulation" and a "demodulation". At this time, the classification is performed with data matched with the current inside database 30 and inputted, through a reclassification procedure, and the technical classification based on the patent map drawing can be more fractionalized through a repetitive work.

Figure 2:
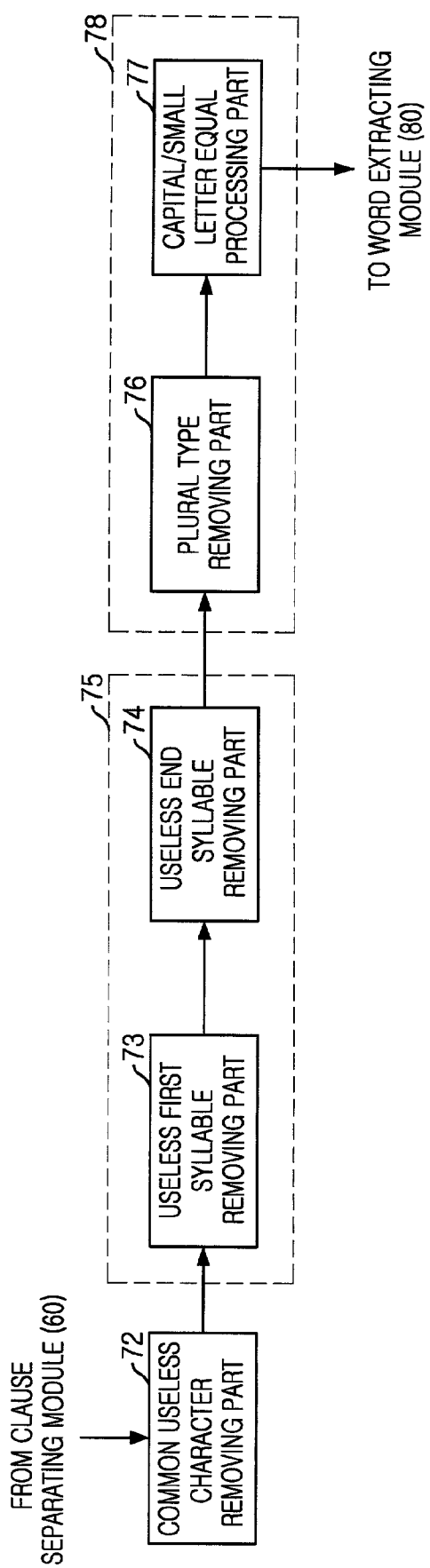
FIG. 2 represents a detailed block diagram in one embodiment of a useless character eliminating module shown in FIG. 1.

FIG. 2 is a detailed block diagram in one embodiment of the useless character eliminating module shown in FIG. 1.

As shown in FIG. 2, the useless character eliminating module 70 includes a common useless character removing part 72, a Korean language useless character removing part 75, and a foreign language useless character removing part 78. The Korean language useless character removing part 75 is composed of a useless first syllable removing part 73 and a useless end syllable removing part 74, and the foreign language useless character removing part 78 contains a plural type removing part 76 and a capital/small letter equal processing part 77.

The common useless character removing part 72 removes an unnecessary word from the sentence of a clause unit provided from the clause separating module 60 on the basis of the common useless word list which is applied to worldwide languages, and provides the useless first syllable removing part 73 with the sentence from which the common useless word is removed.

That is, the common useless character removing part 72 compares the sentence of a clause unit with the already stored common useless word list, to eliminate the word contained into the common useless word list among the sentences of a clause unit.

For example, in the common useless word list, it is stored a useless word such as "잘", "매우", "그리고" and "또는" etc. in a case of Korean language, a word such as "a" "the", "this", "that", "much" and "little" etc. in a case of English, a word such as "des", "dem" and "den" etc. in a case of German, and a word such as "La" and "De" etc. in a case of French.

Therefore, the common useless character removing part 72 removes the word corresponding to the common useless word list among the sentences of a clause unit provided from the clause separating module 60, and provides the useless first syllable removing part 73 of the Korean language useless character removing part 75 with the sentence from which such word is removed.

The useless first syllable removing part 73 removes the useless word of a first syllable from the sentence of a clause unit which is provided from the common useless character removing part 72 and is gotten by removing the common useless character, and provides the useless end syllable removing part 74 with the sentence from which the useless word of the first syllable is eliminated.

In other words, the useless first syllable removing part 73 eliminates the word corresponding to the first syllable useless word list among the sentences based on a unit of a clause from which the common useless character is eliminated. For instance, since the first syllable useless word list contains a prefix such as "the extreme" and "the most", it is eliminated the word corresponding to the first syllable useless word list from the inputted sentences based on a unit of a clause.

The useless end syllable removing part 74 eliminates the useless word corresponding to the end syllable useless word list from the sentence of a clause unit which is provided from the useless first syllable removing part 73 and is gotten by removing the useless word of the first syllable, and provides the plural type removing part 76 of the foreign language useless character removing part 78 with the sentence of a clause unit from which the useless word of the end syllable is eliminated.

Herewith, in Korean language the end syllable useless word list contains "의" and "는" as an objective postposition, "은" as a pre-noun type postposition, "을" and "를" as a subjective postposition, and also contains useless words such as "하는" "하고" and "하여" etc. which correspond to the ending of a word of a verb. Thus, the word corresponding to the end syllable useless word list is removed from the sentence of a clause unit from which the useless word of the first syllable is removed.

The plural type removing part 76 eliminates the useless word corresponding to the plural type useless word list from the sentence of a clause unit from which the useless word of the end syllable is removed in the useless end syllable removing part 74, and provides the capital/small letter equal processing part 77 with the sentence of a clause unit from which this plural type useless word is removed.

Herewith, the plural type useless word list contains "s" and "es" as a plural type in English, and also contains useless words of a plural type for French, German and Japanese under the same conception. Therefore, the word corresponding to the plural type useless word list is eliminated from the sentence of a clause unit from which the useless word of the end syllable is removed.

The capital/small letter equal processing part 77 processes, as the same word, the word corresponding to the same word list among the sentences of a clause unit from which this plural type useless words are removed in the plural type removing part 76. Then, the capital/small letter equal processing part 77 provides the word extracting module 80 with the sentences of a clause unit which are processed as the same word.

Figure 3:
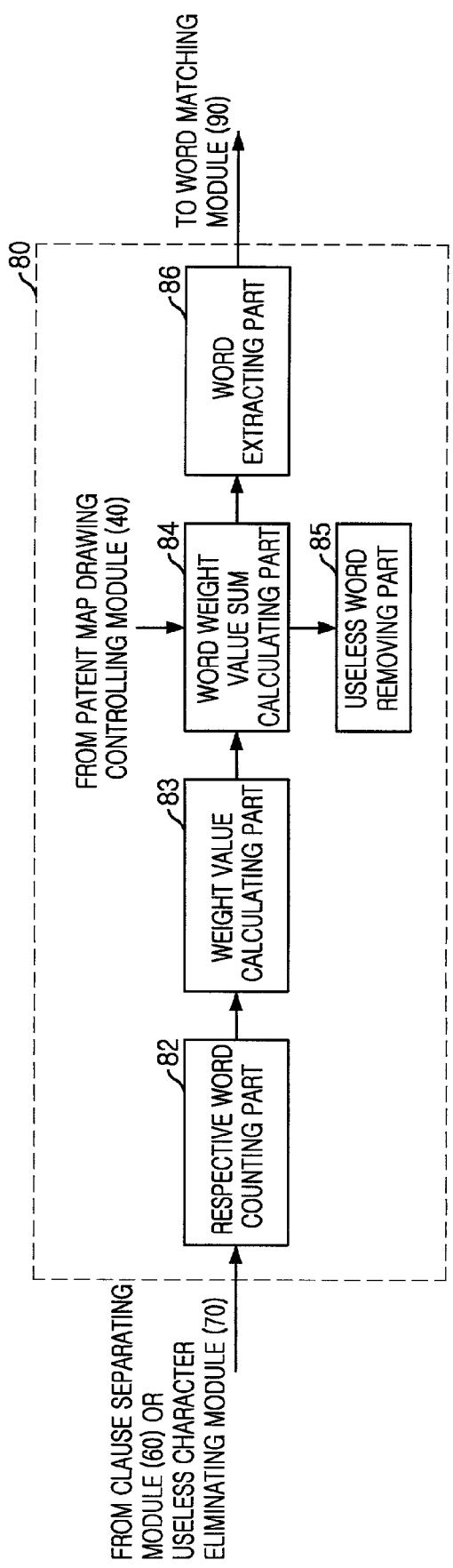
FIG. 3 depicts a detailed block diagram in one embodiment of a word extracting module shown in FIG. 1.

FIG. 3 is a detailed block diagram in one embodiment of the word extracting module shown in FIG. 1.

As shown in FIG. 3, the word extracting module includes a respective-words counting part 82, a weight value calculating part 83, a word weight value sum calculating part 84, a useless word removing part 85 and a word extracting part 86.

The respective words counting part 82 receives the sentence of a clause unit from which the useless word from the useless character eliminating module 70 is removed, or the sentence separated in a unit of a clause by the clause separating module 60, and counts the number per word in a corresponding sentence, and sends counting information per the corresponding word to the weight value calculating part 83.

The weight value calculating part 83 calculates a weight value of the rest words by a counting value of a word having the most many counting number, namely, a word having the most many frequency number among the sentences, referring to counting information per corresponding word which is provided from the respective word counting part 82. Also, the weight value calculating part 83 sends the calculated weight value information per word to the word weight value sum calculating part 84.

For example, assuming that in a first patent, it is represented a word A by twenty times, a word B by fifteen times, a word C by ten times and a word D by five times, at this time a word corresponding to the highest frequency number becomes the word A. Since this word A is represented twenty times, the rest words are divided by 20 which is the value of the highest frequency number. As its result, the word A becomes 1, the word B 0.75, the word C 0.5, and the word D 0.25. At this time, 1 of the word A, 0.75 of the word B, 0.5 of the word C and 0.25 of the word D become the weight value.

Also, assuming that the frequency number of the word is checked in a second patent and its result is represented the word A by five times, the word B by ten times, the word C by zero time, the word D by five times and a word F by five times; at this time, when the weight value is gotten by dividing by the highest frequency number 10 of word, the word A becomes 0.5, the word B becomes 1, the word C becomes 0, the word D 0.5, and the word F 0.5. Therefore, the weight value information per word of a corresponding patent is generated by applying such method to respective patents, and such generated weight value information per word is provided to the word weight value sum calculating part 84.

The word weight value sum calculating part 84 computes the sum of the weight value information per word by using the respective word weight information of a corresponding patent provided from the weight value calculating part 83, and represents the calculated sum of weight value through an outside display, and sends the calculated respective word weight value sum information to the useless word removing part 85 or the word extracting part 86 according to a selection signal inputted from the patent map drawing controlling module 40.

That is, the user clarifies the sum of the respective word weight value information represented through the display, and selects a simple range selection mode through the patent map drawing controlling module 40. Then, only the word provided within the range that the user determines on information of the words A, B, D, F and C by an order of the weight values is sent to the word extracting part 86; for instance, when the user selects only the words A, B and D, only a corresponding word is sent to the word extracting part 86.

Further, the user clarifies the sum of the respective word weight value information represented through the display, and selects the useless word removing mode through the patent map drawing controlling module 40, and also selects the useless word to be eliminated. Then, the word weight value sum calculating part 84 sends the calculated respective word weight value sum information and the selected word removing information to the useless word removing part 85. At this time, the useless word removing part 85 removes the word selected by the user, from the word of the respective word weight value sum information, and sends only the rest words to the word extracting part 86.

For example, in analyzing 50 patents, and in case that the sum of the weight values becomes 40 in the word A, 20 in the word B, 7 in the word C, 20 in the word D and 10 in the word F, and that the words A, B, D, F and C are inputted to the useless word removing part 85 by an order of the weight values, the useless word removing part 85 eliminates the word designated as unnecessary word even though it is the word having a high weight value by the selection of the user. Therefore, when the words A, B and F are designated as the useless words by the user, the useless word removing part 85 provides the word extracting part 86 with only the rest words B, F and C.

Though it was here provided for the user to selectively determine a simple range selection mode or a useless word removing mode, it will be more desirable to extract only a word which can satisfy all two modes as the simple range selection mode or the useless word removing mode.

The word extracting part 86 extracts the corresponding word on the basis of the word weight value sum information inputted through the word weight value sum calculating part 84 or the word weight value sum information which is inputted through the useless word removing part 85 and is gotten by eliminating the useless words. Then, the word extracting part 86 sends it to the word matching module 90.

Figure 4:
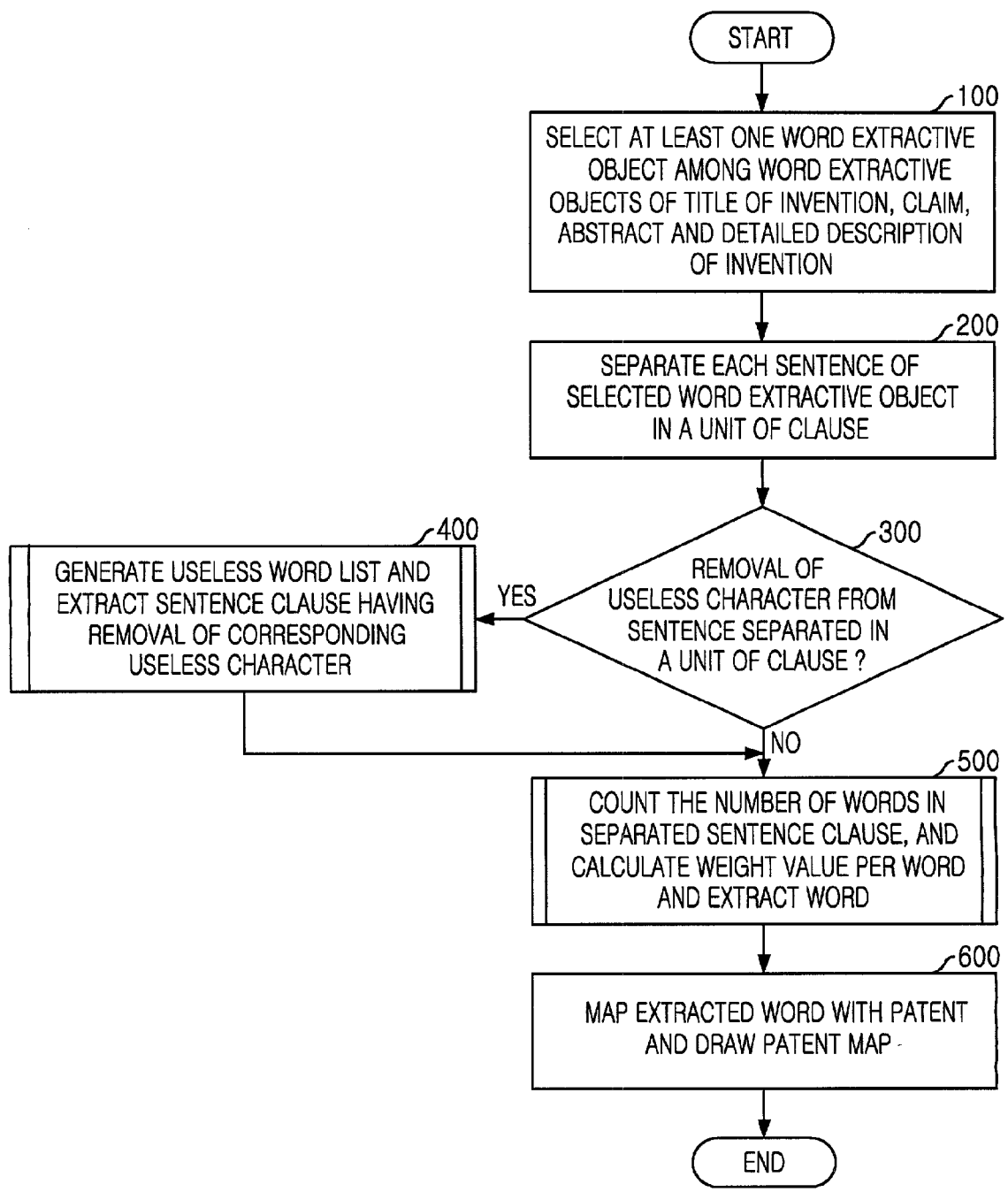
FIG. 4 is a flowchart of one embodiment for a method of drawing a patent map using a technical field word in accordance with the present invention.

FIG. 4 is a flowchart of one embodiment for a method of drawing the patent map using the technical field word in accordance with the present invention.

Patent information provided from respective patent information providing sites 10, 11, 12, 13 is down-loaded through respective interlocking equipments 20, 21, 22, 23, and is stored at the inside database 30. After that, the extractive object selection and sentence extracting module 50 selects a corresponding extractive object from the patent information provided from the inside database 30 by a control signal of the patent map drawing controlling module 40, and extracts the sentence contained into the extractive object, and sends it to the clause separating module 60.

Herewith, the patent information stored at the inside database 30 contains bibliographic terms, and also includes the title of the invention containing a word, the abstract, the claims and the detailed description of the invention, and these are classified into individual extractive objects and stored.

A sentence of the extractive object selected through the clause separating module 60 is separated in a unit of a clause in a step 200, and it is decided whether a useless character is removed from the sentence separated in a unit of a clause in a step 300.

As a decision result of the step 300, in case that the useless character is removed from the sentence separated in a unit of a clause, the sentence separated in a unit of a clause is provided to the useless character eliminating module 70, to eliminate a corresponding useless character referring to a useless word list of the useless character eliminating module 70, and is progressed to a step 500 of extracting the word provided in the separated sentence according to a weight value.

As the decision result of the step 300, in case that the useless character is not removed from the sentence separated in a unit of a clause, it is progressed to the step 500 of extracting the word provided in the separated sentence according to the weight value.

That is, in case the useless character is removed, the useless character among the sentences separated in a unit of a clause in the clause separating module 60 is eliminated in the useless character eliminating module 70, and the sentence of a clause unit from which this useless character is removed is sent to the word extracting module 80. Herewith, since the useless character eliminating module 70 stores the useless word list or a word dictionary, the useless character eliminating module 70 compares the inputted sentence of a clause unit with the useless word list, to thereby remove unnecessary characters. Since characteristics on respective languages are different from each other, it is preferably nodded to respectively provide a useless word list corresponding to all of language areas, a useless word list corresponding to Korean language, and a useless word list corresponding to a foreign language, and also, a corresponding sentence of a clause unit and these lists are compared with each other in sequence, to thereby, finally eliminate unnecessary characters.

While, in the step 500, the sentence of a clause unit from which the useless character is removed is received from the useless character eliminating module 70, or the sentence separated in a unit of a clause is received from the clause separating module 60, and in this sentence, numerous useful words are extracted. Also, on the basis of the most many words number among these extracted numerous words, the rest numerous words are divided to calculate the weight value per word, and the weight value sum of the calculated word is computed to extract the word in the step 500. This extracted word is matched with a patent by the word matching module 80, and a patent map is drawn on the basis of the matched information in a step 600.

Herewith, it is general to match the extracted word and the patent in 1:1, but it is valid to match by a plural matching of 1:N by the user. For example, in case one patent contains a word A and a word B more than two, it is compared whether the word A is more or the word B is more, to thereby enable to perform the 1:1 matching process and also perform the plural matching of 1:N containing two simultaneously.

Further, in the drawing of the patent map, the patent map is drawn by respective technical field, nation, application period and applicant on the basis of the classified words.

Figure 5:
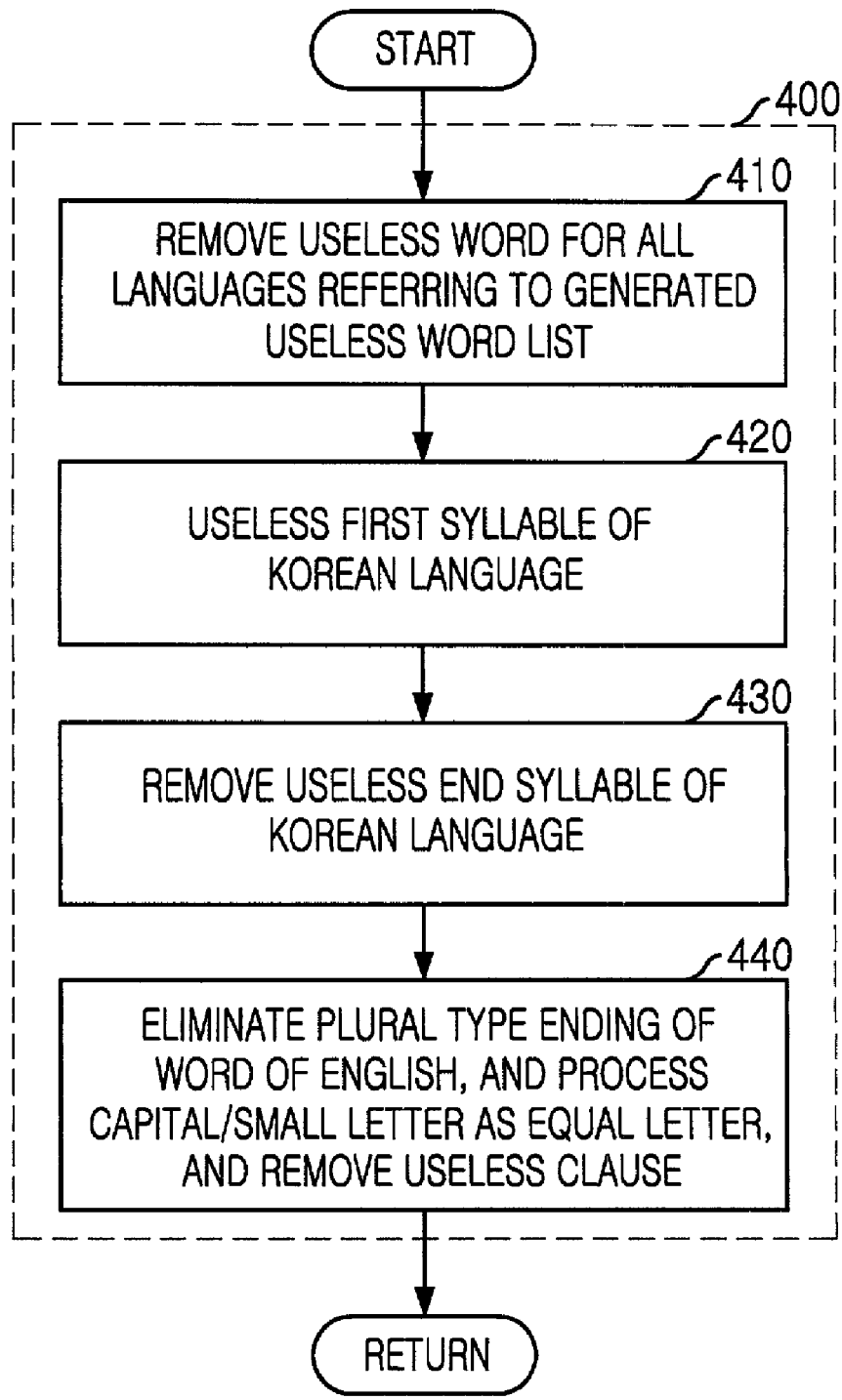
FIG. 5 illustrates a detailed flowchart of one embodiment for a useless character eliminating procedure shown in FIG. 4.

FIG. 5 is a detailed flowchart of one embodiment for a useless character eliminating procedure shown in FIG. 4.

As shown in FIG. 5, an unnecessary word corresponding to the common useless word list of the common useless character removing part 72 is removed from the sentence separated in a unit of a clause through the clause separating module 60, and the sentence having a removal of the common useless word is sent to the useless first syllable removing part 73 in a step 410.

Then, in the sentence of a clause unit having the removal of the common useless character, a word corresponding to a first syllable useless word list is eliminated from the sentence of a clause unit through the useless first syllable removing part 73, and the sentence having the removal of this first syllable useless word is sent to the useless end syllable removing part 74.

At this time, in the sentence having the removal of the word corresponding to the first syllable useless word list, a word corresponding to the end syllable useless word list is removed through the useless end syllable removing part 74, and the sentence of a clause unit having the removal of the this end syllable useless word is sent to the plural type removing part 76 of the foreign language useless character removing part 78 in a step 430.

Also, the useless word which corresponds to the plural type useless word list is removed from the sentence of a clause unit which has the removal of the end syllable useless word in the step 430, through the plural type removing part 76. Among the sentences of a clause unit having the removal of this plural type useless word, the word corresponding to the same word list is processed as the same word through the capital/small letter equal processing part 77 in a step 440, and the sentence of a clause unit which is processed as the same word is sent to the word extracting module 80.

Figure 6:
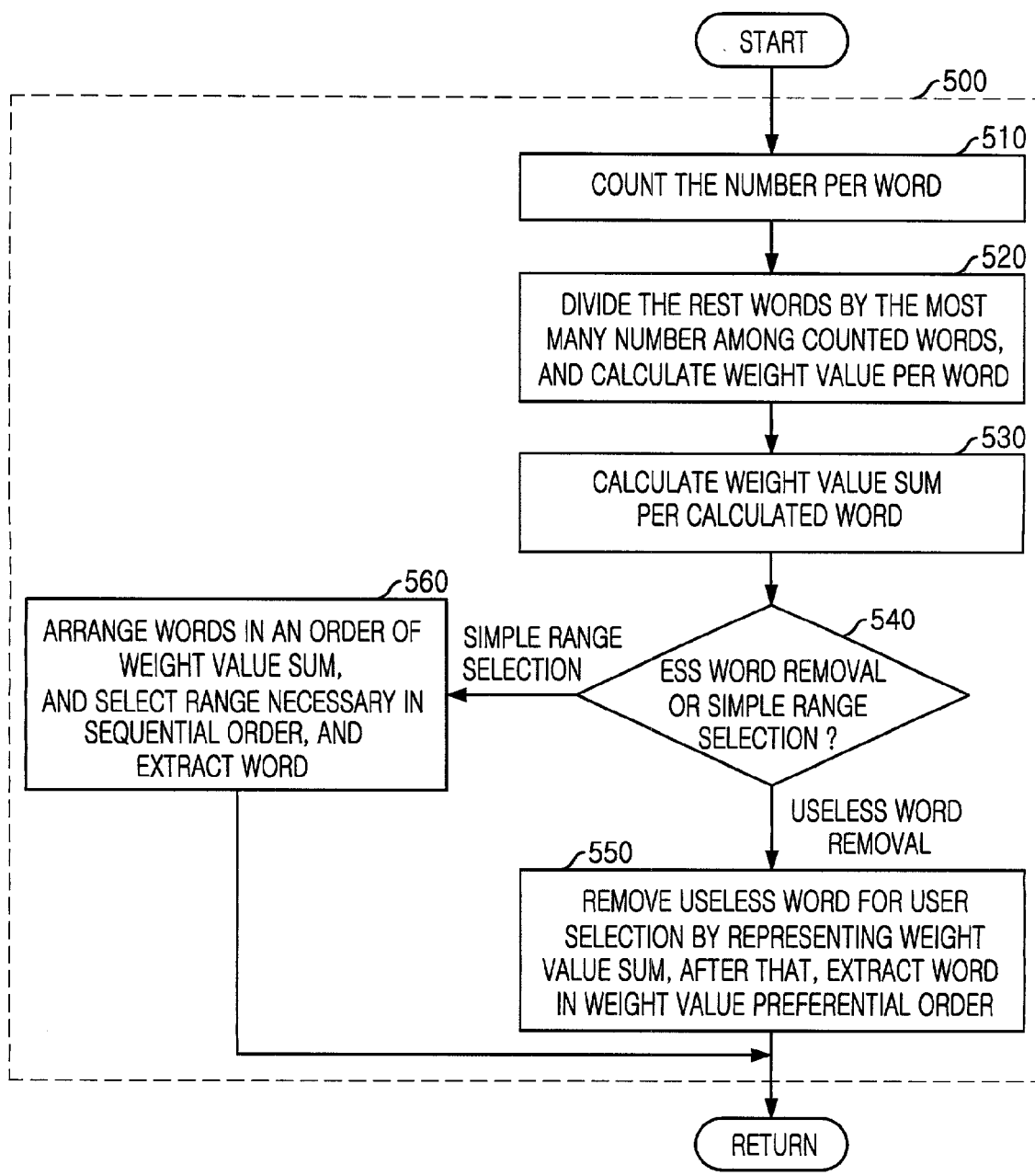
FIG. 6 is a detailed flowchart of one embodiment for a word extracting procedure which is provided in a word extracting object shown in FIG. 4.

FIG. 6 is a detailed flowchart of one embodiment for the word extracting procedure which is provided in the word extracting object shown in FIG. 4.

As shown in FIG. 6, it is inputted the sentence of a clause unit having the removal of the useless character through the useless character eliminating module 70, or the sentence separated in a unit of a clause through the clause separating module 60. Also, the number per word for a corresponding sentence is counted through the respective word counting part 82, and counting information per corresponding word is sent to the weight value calculating part 83 in a step 510.

After that, with reference to the counting information per corresponding word which is provided in the step 510, the weight value of the rest words is computed by a counting value having the most many counting number of a word, namely, the highest frequency number among the sentences in a step 520.

And then, the weight value information per word calculated in the step 520 is sent to the word weight value sum calculating part 84, to compute as the sum of the weight value information per word, and on the basis of the sum of the weight value information per word, it is decided whether the useless word removing mode will be performed, or the simple range selection mode will be performed, in a step 540.

In the decision result of the step 540, in case that the user clarifies the respective word weight value sum information which is represented through the display, and selects the simple range selection mode, the respective word weight value sum information is provided to the word extracting part 86 in an order of the weight values, to extract the weight value sum information provided within the range selected by the user in a step 560.

In the decision result of the step 540, in case that the user clarifies the respective word weight value sum information and selects the useless word removing mode, the calculated respective word weight value sum information is provided to the useless word removing part 85. Therefore, the useless word removing part 85 eliminates the word selected by the user from the words of the respective word weight value sum information, and after that, extracts the weight value sum information in a step 550. Then, it is progressed to a step 600 of drawing the patent map on the basis of the extracted word.

A method of the present invention above-described can be embodied as a program, and this program can be stored at a record medium such as a CDROM, a RAM, a ROM, a floppy disk, a hard disk, and an optical magnetic disk etc., the record medium being read through a computer.

As afore-mentioned, in accordance with the present invention, a weight value of an important word having a removal of unnecessary word from patent data is calculated, to thus draw a patent map and to thereby enable to draw an exact patent map complying with a requirement of a user.

In addition, in the present invention, since a person who executes a patent map work doesn't have to see the specifications one by one, a drawing time of the patent map can be shortened in epoch-making and a convenience for the user can be improved considerably.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. A system for drawing a patent map using a technical field word, comprising:
   a storing unit for receiving a download of patent information from at least one patent information providing site and storing it;
   an extractive object selection and sentence extracting unit for selecting at least one word extraction object and extracting a sentence of the selected word extraction object from the patent information stored at the storing unit;
   a clause separating unit for separating, in a unit of a clause, the sentence of the extractive object selected in the extractive object selection and sentence extracting unit;
   a word extracting unit for counting the number of words in the sentence which is separated in a unit of a clause in the clause separating unit, calculating weight values and the sum of the weight values by respective words, and extracting the word;
   a word matching unit for matching the word extracted from the word extracting unit, with a patent;
   a patent map drawing unit for drawing a patent map referring to data matched in the word matching unit; and
   a patent map drawing controlling unit for controlling the word extraction object of the extractive object selection and sentence extracting unit.

2. The system as recited in claim 1, wherein said word extracting unit includes:
   a respective word counting part for counting the number of words per each word in the sentence based on a unit of a clause outputted from the clause separating unit;
   a weight value calculating part for dividing the rest respective words number by the most many word number among the words counted in the respective word counting part, and calculating the weight value per word;
   a word weight value sum calculating part for calculating the sum of weight values per word calculated in the weight value calculating part; and
   a word extracting part for receiving the words from the word weight value sum calculating part, arranging them in an order of the weight value sum, and extracting the word by up to a range selected in a weight value sequential order.

3. The system as recited in claim 1, wherein said word extracting unit includes:
   a respective word counting part for counting the number of the words per each word in the sentence based on a unit of a clause outputted from the clause separating unit;
   a weight value calculating part for dividing the rest respective words number by the most many word number among the words counted in the respective word counting part, and calculating the weight value per word;
   a word weight value sum calculating part for calculating the sum of weight values per word calculated in the weight value calculating part;
   a useless word removing part for arranging the words in an order of the weight value sum computed in the word weight value sum calculating part, and removing a useless word from a corresponding word; and
   a word extracting part for selectively receiving the words having a removal of the useless word in the useless word removing part, or the words provided from the word weight value sum calculating part, by a control of the patent map drawing controlling unit, for arranging them in an order of the weight value sum, and extracting the words by up to the range selected in a weight value sequential order.

4. The system as recited in claim 1, wherein the word extractive object contains at least one object among the title of the invention, the claims, the abstract and the detailed description of the invention.

5. A system for drawing a patent map using a technical field word, comprising:
   a storing unit for receiving a download of patent information from at least one patent information providing site and storing it;

an extractive object selection and sentence extracting unit for selecting at least one word extraction object and extracting a sentence of the selected word extraction object from the patent information stored at the storing unit;

a clause separating unit for separating, in a unit of a clause, the sentence of the extractive object selected in the extractive object selection and sentence extracting unit;

a useless character eliminating part for removing a useless character corresponding to an already stored useless word list from a sentence based on a unit of a clause which is separated in the clause separating unit, and extracting the sentence based on a unit of a clause which has a removal of the useless character;

a word extracting unit for selectively receiving the sentence based on a unit of a clause from which the useless character is removed in the useless character eliminating unit, or the sentence separated in a unit of a clause in the clause separating unit, counting the number of words, calculating a weight value and a weight value sum per word, and extracting the word;

a word matching unit for matching the word extracted in the word extracting unit with a patent;

a patent map drawing unit for drawing a patent map referring to data matched in the word matching unit; and a patent map drawing controlling unit for controlling the word extraction object of the extractive object selection and sentence extracting unit, and controlling a selective output of the clause separating unit.

6. The system as recited in claim 5, wherein said useless character eliminating unit includes at least any one out of:

a common useless character removing part for removing the useless character from the sentence of a clause unit provided from the clause separating unit on the basis of a common useless word list which is applied to the useless word per worldwide language;

a useless character removing part for eliminating a useless first syllable from the sentence based on a unit of a clause by a first syllable useless word list, or removing a useless end syllable by an end syllable useless word list; and a foreign language useless character removing part for removing a plural type word of foreign language or processing a capital letter and a small letter equally.

7. The system as recited in claim 5, wherein the word extractive object contains at least one object among the title of the invention, the claims, the abstract and the detailed description of the invention.

8. A method of drawing a patent map using a technical field word in a patent map drawing system, said method comprising the steps of:

a) receiving a download of patent information from at least one patent information providing site and storing it at an inside database;

b) selecting at least one word extraction object and extracting a sentence from the patent information stored at the inside database;

c) separating, in a unit of a clause, the sentence of the selected extractive object;

d) eliminating a useless character corresponding to an already stored useless word list from the sentence separated in a unit of a clause, and extracting the sentence of a clause unit which is gotten by removing the useless character;

e) selectively receiving the sentence based on a unit of a clause from which the useless character is removed, or the sentence separated in a unit of a clause, counting the number of words, calculating weight values and the sum of the weight values by respective words, and extracting the word; and f) matching the extracted word with a patent, and drawing the patent map.

9. The method as recited in claim 8, wherein said step d) includes the step of d1) removing the useless character from the sentence separated in a unit of a clause, according to the common useless word list which is applied to the useless word of worldwide languages.

10. The method as recited in claim 8, wherein said step d) further includes the step of d2) eliminating a useless first syllable from the sentence based on a unit of a clause from which the common useless character is removed, according to a first syllable useless word list of Korean language, and removing a useless end syllable by an end syllable useless word list.

11. The method as recited in claim 8, wherein said step d) further includes the step of d3) eliminating a plural type word of foreign language from the sentence based on a unit of a clause from which the useless characters of a first syllable and an end syllable are removed, and processing a capital letter and a small letter equally.

12. The method as recited in claim 8, wherein said step e) includes the steps of:

e1) selectively receiving the sentence based on a unit of a clause from which the useless character is removed, or the sentence separated in a unit of a clause, and counting the number of words for respective words;

e2) dividing the rest respective words number by the most many word number among the counted words, calculating the weight value per word, and computing the weight value sum per this calculated word; and e3) arranging the words in which the weight value sum is calculated, in an order of the weight value sum, and extracting the word by up to a range selected in an weight value sequential order.

13. The method as recited in claim 8, wherein said step e) includes the steps of:

e1) selectively receiving the sentence based on a unit of a clause from which the useless character is removed, or the sentence separated in a unit of a clause, and counting the number of words for respective words;

e2) dividing the rest respective words number by the most many word number among the counted words, calculating the weight value per word, and computing the weight value sum per this calculated word;

e3) arranging the words in which the weight value sum is calculated, in an order of the weight value sum, and removing the useless word from a corresponding word; and e4) selectively receiving the word from which the useless word is removed, or the word in which the weight value sum is computed, arranging the words in an order of the weight value sum, and extracting the word by up to the range selected in an weight value sequential order.

14. A computer readable recording medium storing instructions for executing a method of drawing a patent map using a technical field word, in a patent map drawing system having a processor, said method comprising the steps of:

a) receiving a download of patent information from at least one patent information providing site and storing it at an inside database;

b) selecting at least one word extraction object and extracting a sentence from the patent information stored at the inside database;
c) separating, in a unit of a clause, the sentence of the selected extractive object;
d) eliminating a useless character corresponding to an already stored useless word list from the sentence separated in a unit of a clause, and extracting the sentence of a clause unit which is gotten by removing the useless character;

e) selectively receiving the sentence based on a unit of a clause from which the useless character is removed, or the sentence separated in a unit of a clause, counting the number of words, calculating weight values and the sum of the weight values by respective words, and extracting the word; and
f) matching the extracted word with a patent, and drawing the patent map.

* * * * *